Figure 1:
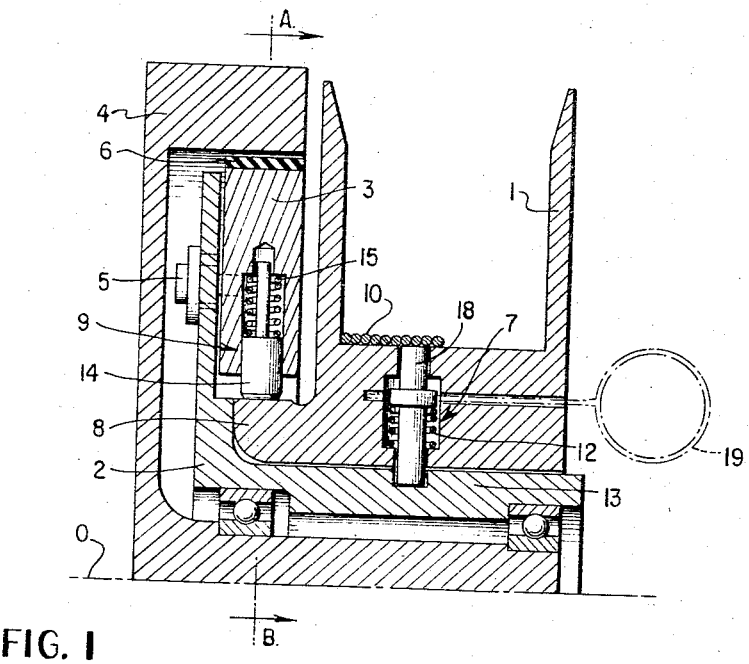

Aug. 1, 1967   M. POHL ET AL   3,333,821
BRAKING DEVICE FOR A WINCH
Filed Oct. 4, 1965   2 Sheets-Sheet 1

INVENTORS.
MANFRED POHL
HORST DEPPNER

BY James E. Bryan
ATTORNEY

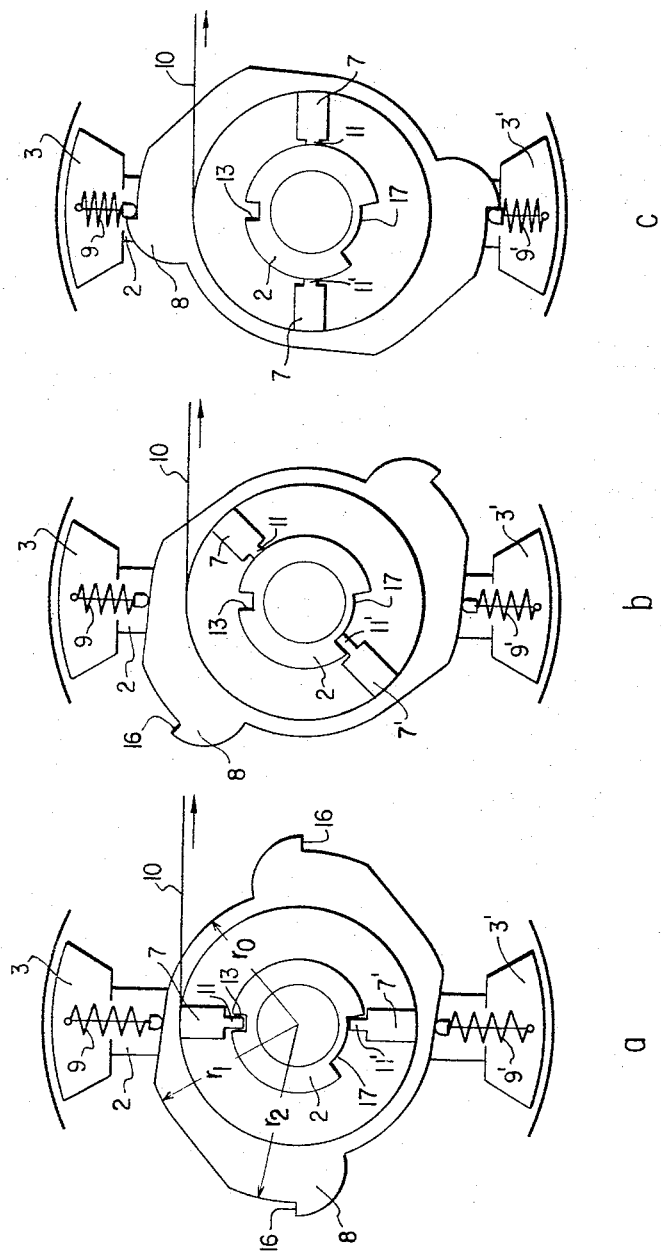

3,333,821
BRAKING DEVICE FOR A WINCH
Manfred Pohl and Horst Deppner, Mimmenhausen, Germany, assignors to Dornier Systems G.m.b.H., a limited-liability corporation of Germany
Filed Oct. 4, 1965, Ser. No. 492,591
Claims priority, application Germany, Apr. 10, 1965, D 47,010
8 Claims. (Cl. 254—150)

The present invention relates to a braking device for winches, particularly winches used for paying out cables connected to towed air target systems.

Towed bodies for use as air targets are customarily carried aloft by aircraft and released therefrom only within the air space in which a mission is to be performed. The targets are paid out on a towing cable to a safe distance behind the towing aircraft and a thin steel wire or cable generally is employed as the towing means. The pay out speed must be regulated in order that the cable is paid out without difficulties. In particular, braking means must be employed in order to prevent a shock or jolt on the cable after the last wire winding on the winch has run off since such a shock or jolt can result in breakage of the cable. It is desirable to maintain the length of the towing cable as short as possible, consistent with safety requirements, because of the space occupied by the cable and the weight thereof.

The regulation of the cable paying out operation can be restricted to braking measures since the air resistance of the towed body and the towing cable supplies a sufficiently large force to unreel the cable from the winch. The present invention relates particularly to a type of unreeling system in which the towed body is extended and then dropped together with the towing cable by cutting the latter, upon completion of the mission.

The pull or tension of the cable acting upon the cable drum increases continuously during the extending or paying out operation because added to the air resistance of the towed body is the air resistance of the towing cable itself which assumes, with increasing towing length, proportions which are many times those of the resistance of the towed body. As a result, all braking measures which exert only a constant or nearly constant braking moment or force are either unsuitable or at least inadequate for use with towed target systems. Further, manual operation of a cable brake has certain disadvantages because operating and controlling devices are required therefor and because the danger of shocks to the cable is involved due to non-uniform braking. Finally, the mere fact that an operator is required is a disadvantage since this precludes the use of the braking system in unmanned towing aircraft, which frequently are utilized for the purpose. Additionally, manual operation of the braking system requires some attention by the pilot, who usually must attend to other duties and functions during the paying out or extending operation.

It has been previously proposed to run the towing cable through a zigzag-shaped clamping device forward of the cable drum whereby a certain automatic braking is exerted. This braking device, however, exerts an additional undesirable mechanical load on the towing cable. There also is the danger that, after a shock, the cable drum will continue to rotate more rapidly, resulting from the inertia thereof, than the speed corresponding to the run-off speed of the cable, which can produce serious difficulties. Furthermore, the end of the cable is thickened to exert the final braking pressure and this involves further complications regarding the manufacture of the cable.

The present invention provides a braking device for pay out or unreeling winches in towed air target systems which operates automatically and in dependence upon the load and which will brake the cable winch to an actual standstill shortly before the cable has completely run off without producing any jolts or shocks on the cable. The system of the present invention is safe, sturdy, and economical and includes (a) at least one unlocking or releasing mechanism between a cable drum and a brake mounting, which mechanism operates in dependence upon a cable length-measuring apparatus;
(b) a brake mounting which, in the locked position thereof, rotates with the cable drum and which, in the unlocked or released position, rotates relative to the drum as a result of the braking force;
(c) a brake shoe which is freely movable with respect to the brake mounting and is operated by centrifugal force caused by rotation of the cable drum, and
(d) a pressure member which imparts to the brake shoes an additional braking pressure dependent upon the relative degree of rotation between the brake mounting and the cable drum.

Figure 2:
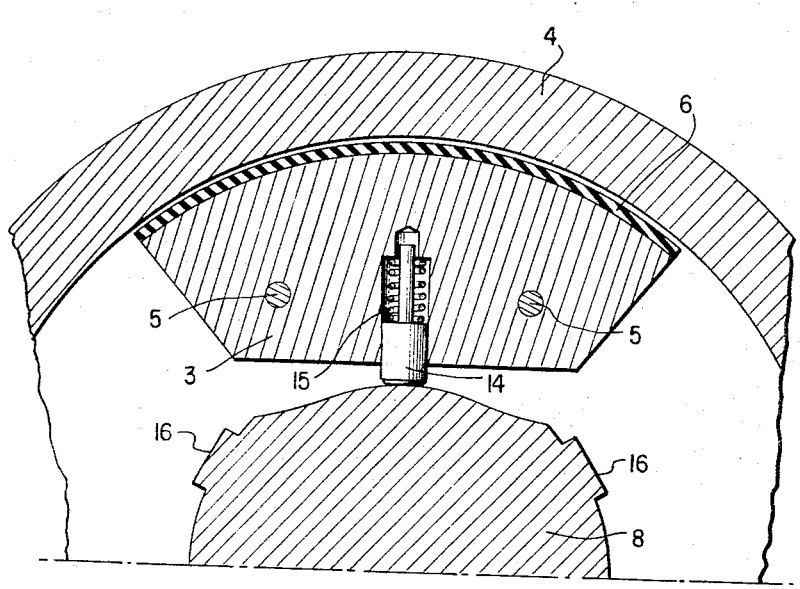

The present invention will be further illustrated by reference to the accompanying drawings in which FIGURE 1 is a view in cross-section through one half of an unreeling or pay out winch and centrifugally-operated brake constructed in accordance with the present invention, FIGURE 2 is a sectional view taken on line A–B of FIGURE 1 and shows the cam and cam follower utilized to produce additional braking pressure on the brake shoe, and FIGURES 3a, 3b, and 3c are schematic views in cross-section through another embodiment of the winch of the present invention showing a means whereby a graduated final braking pressure may be exerted on the brake shoe.

Referring to FIGURE 1, the winch is composed of the cable drum 1, the brake mounting 2, the brake segment or shoe 3, and the housing 4, which latter is mounted rigidly on an aircraft, the inner wall of the housing 4 serving as a brake drum for the centrifugally-operated brake. During the unwinding operation, the cable drum 1, the brake mounting 2, with the brake shoe 3, rotate about the axis O. The connecting bolts 5, which pass through oblong holes in the member 2, permit the brake shoe 3 to move radially under the action of the centrifugal force produced, whereby the brake shoe is pressed against the inner wall of the housing 4. The reference numeral 6 identifies the brake lining. The centrifugally-operated brake operates constantly and in a self-regulating manner. In case of a divergence from the theoretical or desired rate of revolution of the brake, the braking moment or force is increased and, respectively, decreased quadratically. Any jolts or shocks on the cable thereby are precluded.

For the purpose of completely braking the cable drum before the cable has entirely run off, a constant spring force is superimposed on the centrifugal force acting on the brake shoe 3. This is achieved with the aid of an unlocking or releasing mechanism 7 which consists of an arresting or retaining detent 11 and a spring 12 for unlocking the cable drum 1 from the brake mounting 2, a cam plate 8 rigid with the cable drum, and a pressure member or cam follower 9. When the windings of the towing cable 10, positioned over the cable length-measuring device 18, run off the cable drum 1, the arresting detent 11 can move radially outwardly, with respect to the drum 1, as a result of the pressure of the spring 12 thereon and will snap out of the bore 13 in the brake mounting 2. The cable drum 1 and the brake mounting 2 now will rotate relative to one another since opposing moments are exerted upon each of the parts by the cable traction or tension and by the braking force. The arresting needle 19, shown in phantom in FIGURE 1, makes it possible to retain the detent 11 against the pressure of the spring 12 until the lowermost layer of cable is wound on the cable drum 1.

Further operation of the device is more readily apparent from FIGURE 2. During the relative rotation of the parts 1 and 2, the spring-loaded cam follower 14 of the pressure member 9 moves relative to the cam plate 8, as a result of which the spring 15 is compressed. Due to the additional spring force, the brake shoe 3 is forced against the brake drum with a greater pressure. The cam follower 14 is limited in the end positioned thereof by means of a projection 16 on the cam plate 8. In this manner, a constant braking moment or pressure is superimposed on the centrifugal force-dependent braking moment, this constant braking moment being dependent upon the characteristics of the spring 15 and upon the length of the stroke of the cam follower 14 which, in turn, depends upon the configuration or design of the cam plate 8. As shown in FIGURE 2, the cam plate is symmetrical and, thus, the winch may be operated in either direction of rotation.

FIGURES 3a, 3b, and 3c show the operation of a further embodiment of the apparatus which permits a graduated braking moment during the final braking operation, with the result that the final braking will be smoother. In this embodiment, the cam plate 8, having the base radius $r_0$, has two identical halves so that additional braking pressure may be applied to the two brake shoes 3 and 3'. The cam plate has, in addition, two portions of enlarged radii $r_1$ and $r_2$, with $r_2$ being larger than $r_1$, and $r_1$ being larger than $r_0$.

In addition to the unlocking mechanism 7 described above, is a second unlocking or releasing mechanism 7' so constructed that it becomes responsive at a later time. This may be achieved, for example, by mounting the unlocking mechanism 7' opposite and axially laterally to the unlocking mechanism 7. The bore or recess for the arresting detent 11' of the unlocking mechanism 7' is formed as a longitudinal groove or slot 17 in the brake mounting 2. The length of the longitudinal groove 17 depends upon the length of the radius segment $r_1$ on the cam plate 8. In the embodiment shown, final braking of the towing cable, being nearly completely unwound, occurs in two stages. As soon as the last cable layer has been unwound over the unlocking mechanism 7, the arresting detent 11 will snap out of the bore 13 and the cable drum will rotate with respect to the brake mounting 2. The springs of the pressure members 9 and 9' are compressed when the cam followers engage the portions of enlarged radii $r_1$ on the cam plate 8 and, thus, the bearing pressure on the brake shoes 3 and 3' is increased. This first relative rotation between the parts 1 and 2 is terminated when the arresting detent 11' of the unlocking mechanism 7' reaches the stop on the longitudinal groove 17, as shown in FIGURE 3b. The first stage of bearing pressure of the brake shoes 3 and 3' will remain in the position shown in FIGURE 3b until the unlocking mechanism 7' is actuated, after the run-off of the layer of cable positioned thereover, and until the detent 11' snaps out of the brake mounting 2. The drum 1 then can further rotate, together with the cam plate 8, until the position shown in FIGURE 3c has been reached. The braking pressure is thereby further increased, due to the increased radius $r_2$ of the cam plate 8.

The embodiments shown are merely illustrative and explain the principle of the present invention. Modifications thereof and technically more desirable constructions may be possible. Thus, it is immaterial in the present invention whether one or several brake shoes are employed; pairs of oppositely-positioned brake shoes are advantageous. During the graduated braking operation, braking pressure of all the shoes may be intensified as has been described above. It is also possible to additionally connect brake shoes, and pairs of brake shoes, respectively, in the second stage at the same braking pressure. Furthermore, the number of braking stages is not limited to two but may be further increased in accordance with the principles of the invention. Finally, it is not absolutely necessary that the unlocking mechanisms for the successive stages of higher braking pressure be connected in each instance with another coordinated cable-length measuring device. The release of the successive stages may be effected, for example, from the cable length-measuring device of the first stage with the interposition of time-delaying members of known construction.

The retaining stops 16 on the cam plate 8, for terminating the relative rotation between the cable drum and the brake mounting, may be disposed at other points on the contact surface between the two structural elements in order to obtain more favorable lever action.

The braking device of the invention operates automatically and in a self-regulating manner; it adjusts to the respective stresses or loads, and effects a jolt-free final braking shortly before the cable has completely run off the cable drum. In contrast to the known clamping device mentioned above, the braking device of the present invention operates in a more sensitive manner since it responds quadratically to changes in the load. The susceptibility of the device to malfunction or breakdown is extremely small since only mechanical elements are employed and the device is of a sturdy construction. The device has small overall dimensions, low weight, and no additional controlling mechanism is necessary.

It will be obvious to those skilled in the art that many modifications may be made within the scope of the present invention without departing from the spirit thereof, and the invention includes all such modifications.

What is claimed is:

1. A braking device for a cable winch which comprises a stationary brake drum, a first member rotatably mounted relative to the brake drum and having at least one centrifugally-operated brake shoe thereon, a cable drum rotatably mounted on the first member, locking means between the first member and the cable drum, and means for exerting additional braking pressure on the brake shoe.

2. A braking device according to claim 1 in which the locking means is a spring-loaded detent.

3. A braking device according to claim 2 in which the locking means is retained in the locked position by cable wound on the cable drum and unlocked by unwinding the cable.

4. A braking device according to claim 1 in which the means for exerting additional braking pressure on the brake shoe includes cam means on the cable drum and cam follower means on the brake shoe.

5. A braking device according to claim 4 in which the cam follower means is spring-loaded.

6. A braking device according to claim 4 in which the cam means has portions of different radii, whereby varying degrees of braking pressure are exerted on the brake shoe.

7. A braking device according to claim 6 including a plurality of locking means between the first member and the cable drum which locking means are successively unlocked by unwinding the cable to permit varying degrees of relative rotation between the first member and the cable drum.

8. A braking device according to claim 1 including a plurality of centrifugally-operated brake shoes.

References Cited
UNITED STATES PATENTS

| | | | |
|---|---|---|---|
| 286,306 | 10/1893 | Johnson | 254—157 |
| 913,781 | 3/1909 | Stein | 188—185 |
| 2,051,400 | 8/1936 | Taylor | 188—184 |
| 2,596,318 | 5/1952 | Willi | 254—173 |
| 2,896,912 | 7/1959 | Faugier | 188—185 |

EVON C. BLUNK, *Primary Examiner.*

H. C. HORNSBY, *Assistant Examiner.*